United States Patent
Hines (10) Patent No.: US 8,311,774 B2
(45) Date of Patent: Nov. 13, 2012

(54) ROBUST DISTANCE MEASURES FOR ON-LINE MONITORING

(75) Inventor: J. Wesley Hines, Lenoir City, TN (US)

(73) Assignee: SmartSignal Corporation, Lisle, IL (US)

( * ) Notice: Subject to any disclaimer, the term of this patent is extended or adjusted under 35 U.S.C. 154(b) by 285 days.

(21) Appl. No.: 11/956,809

(22) Filed: Dec. 14, 2007

(65) Prior Publication Data

US 2008/0183425 A1 Jul. 31, 2008

Related U.S. Application Data

(60) Provisional application No. 60/870,268, filed on Dec. 15, 2006.

(51) Int. Cl.
*G06F 11/30* (2006.01)

(52) U.S. Cl. ............................................. 702/182

(58) Field of Classification Search ............ 702/58, 702/59, 98, 102, 104, 141, 168, 173, 179, 702/180–183, 185, 188, 189, 193; 703/2; 700/30

See application file for complete search history.

(56) References Cited

U.S. PATENT DOCUMENTS

| | | |
|---|---|---|
| 3,045,221 A | 7/1962 | Roop |
| 3,561,237 A | 2/1971 | Eggers |
| 3,651,454 A | 3/1972 | Venema et al. |
| 3,767,900 A | 10/1973 | Chao |
| 3,851,157 A | 11/1974 | Ellis et al. |
| 3,866,166 A | 2/1975 | Kerscher et al. |
| 3,906,437 A | 9/1975 | Brandwein et al. |
| 3,928,022 A | 12/1975 | Langange |
| 3,992,884 A | 11/1976 | Pacault |
| 4,057,847 A | 11/1977 | Lowell et al. |
| 4,060,716 A | 11/1977 | Pekrul et al. |
| 4,067,061 A | 1/1978 | Juhasz |
| 4,071,898 A | 1/1978 | Schorsch et al. |
| 4,080,654 A | 3/1978 | Walley, Jr. |
| 4,212,064 A | 7/1980 | Forsythe et al. |
| 4,215,412 A | 7/1980 | Bernier et al. |

(Continued)

FOREIGN PATENT DOCUMENTS

EP 0840244 5/2008

(Continued)

OTHER PUBLICATIONS

Hines, J. Wesley, An Autoassociative Empirical Modeling Toolbox for On-line Monitoring, 18th International Congress and Exhibition on Condition, Monitoring and Diagnostic Engineering Management in Cranfield, Bedfordshire, United Kingdom, Aug. 2005, pp. 1-9.

(Continued)

*Primary Examiner* — Mohamed Charioui (74) *Attorney, Agent, or Firm* — Fitch, Even, Tabin & Flannery, LLP (57) ABSTRACT

An apparatus and associated method are utilized for monitoring an operation of a system characterized by operational parameters. A non-parametric empirical model generates estimates of parameter values in response to receiving a query vector of monitored parameters for a model characterizing the system. A distance estimation engine (a) determines robust distances between the query vector and each of a set of predetermined historical vectors for the non-parametric empirical model based on an implementation of an elemental kernel function; (b) determines weights for the monitored parameters based on the robust distances; and (c) combining the weights with the predetermined historical vectors to make predictions for the system.

16 Claims, 5 Drawing Sheets

U.S. PATENT DOCUMENTS

| | | | |
|---|---|---|---|
| 4,267,569 A | 5/1981 | Baumann et al. |
| 4,271,402 A | 6/1981 | Kastura et al. |
| 4,295,128 A | 10/1981 | Hashemian et al. |
| 4,296,409 A | 10/1981 | Whitaker et al. |
| 4,330,838 A | 5/1982 | Yoneda et al. |
| 4,334,136 A | 6/1982 | Mahan et al. |
| 4,336,595 A | 6/1982 | Adams et al. |
| 4,368,510 A | 1/1983 | Anderson |
| 4,398,258 A | 8/1983 | Naitoh et al. |
| 4,402,054 A | 8/1983 | Osborne et al. |
| RE31,582 E | 5/1984 | Hosaka et al. |
| RE31,750 E | 11/1984 | Morrow |
| 4,480,480 A | 11/1984 | Scott et al. |
| 4,517,468 A | 5/1985 | Kemper et al. |
| 4,521,885 A | 6/1985 | Melocik et al. |
| 4,639,882 A | 1/1987 | Keats |
| 4,667,176 A | 5/1987 | Matsuda |
| 4,677,429 A | 6/1987 | Glotzbach |
| 4,707,796 A | 11/1987 | Calabro et al. |
| 4,761,748 A | 8/1988 | Le Rat et al. |
| 4,773,021 A | 9/1988 | Harris et al. |
| 4,796,205 A | 1/1989 | Ishii et al. |
| 4,823,290 A | 4/1989 | Fasack et al. |
| 4,841,456 A | 6/1989 | Hogan, Jr. et al. |
| 4,849,894 A | 7/1989 | Probst |
| 4,924,418 A | 5/1990 | Bachman et al. |
| 4,931,977 A | 6/1990 | Klemes |
| 4,937,763 A | 6/1990 | Mott |
| 4,965,513 A | 10/1990 | Haynes et al. |
| 4,965,549 A | 10/1990 | Koike |
| 4,975,685 A | 12/1990 | Rahhal |
| 4,975,827 A | 12/1990 | Yonezawa |
| 4,978,291 A | 12/1990 | Nakai |
| 4,978,909 A | 12/1990 | Hendrix et al. |
| 4,985,857 A | 1/1991 | Bajpai et al. |
| 4,990,885 A | 2/1991 | Irick et al. |
| 5,003,478 A | 3/1991 | Kobayashi et al. |
| 5,003,479 A | 3/1991 | Kobayashi et al. |
| 5,003,950 A | 4/1991 | Kato et al. |
| 5,005,142 A | 4/1991 | Lipchak et al. |
| 5,005,147 A | 4/1991 | Krishen et al. |
| 5,009,833 A | 4/1991 | Takeuchi et al. |
| 5,010,487 A | 4/1991 | Stonehocker |
| 5,012,414 A | 4/1991 | Ishii et al. |
| 5,012,421 A | 4/1991 | Ishii |
| 5,025,499 A | 6/1991 | Inoue et al. |
| 5,034,889 A | 7/1991 | Abe |
| 5,038,545 A | 8/1991 | Hiendl |
| 5,052,630 A | 10/1991 | Hinsey et al. |
| 5,056,023 A | 10/1991 | Abe |
| 5,063,513 A | 11/1991 | Shank et al. |
| 5,067,099 A | 11/1991 | McCown et al. |
| 5,072,391 A | 12/1991 | Abe |
| 5,088,058 A | 2/1992 | Salsburg |
| 5,091,856 A | 2/1992 | Hasegawa et al. |
| 5,093,792 A | 3/1992 | Taki et al. |
| 5,109,700 A | 5/1992 | Hicho |
| 5,113,483 A | 5/1992 | Keeler et al. |
| 5,119,287 A | 6/1992 | Nakamura et al. |
| 5,119,468 A | 6/1992 | Owens |
| 5,123,017 A | 6/1992 | Simpkins et al. |
| 5,164,895 A | 11/1992 | Lunz et al. |
| 5,166,873 A | 11/1992 | Takatsu et al. |
| 5,173,856 A | 12/1992 | Purnell et al. |
| 5,187,735 A | 2/1993 | Herrero Garcia et al. |
| 5,195,046 A | 3/1993 | Gerardi et al. |
| 5,210,704 A | 5/1993 | Husseiny |
| 5,213,080 A | 5/1993 | Lambert et al. |
| 5,214,582 A | 5/1993 | Gray |
| 5,222,065 A | 6/1993 | Krogmanm |
| 5,223,207 A | 6/1993 | Gross et al. |
| 5,239,462 A | 8/1993 | Jones et al. |
| 5,251,285 A | 10/1993 | Inoue et al. |
| 5,255,208 A | 10/1993 | Thakore et al. |
| 5,262,941 A | 11/1993 | Saladin et al. |
| 5,285,494 A | 2/1994 | Sprecher et al. |
| 5,291,420 A | 3/1994 | Matsumoto et al. |
| 5,309,139 A | 5/1994 | Austin |
| 5,309,351 A | 5/1994 | McCain et al. |
| 5,309,379 A | 5/1994 | Rawlings et al. |
| 5,311,562 A | 5/1994 | Palusamy et al. |
| 5,325,304 A | 6/1994 | Aoki |
| 5,327,349 A | 7/1994 | Hoste |
| 5,333,240 A | 7/1994 | Matsumoto et al. |
| 5,361,336 A | 11/1994 | Atchison |
| 5,386,373 A | 1/1995 | Keeler et al. |
| 5,387,783 A | 2/1995 | Mihm et al. |
| 5,390,776 A | 2/1995 | Thompson |
| 5,402,333 A | 3/1995 | Cardner |
| 5,402,521 A | 3/1995 | Niida et al. |
| 5,410,492 A | 4/1995 | Gross et al. |
| 5,414,619 A | 5/1995 | Katayama et al. |
| 5,414,632 A | 5/1995 | Mochizuki et al. |
| 5,420,571 A | 5/1995 | Coleman et al. |
| 5,421,204 A | 6/1995 | Svaty, Jr. |
| 5,442,553 A | 8/1995 | Parrillo |
| 5,445,347 A | 8/1995 | Ng |
| 5,446,671 A | 8/1995 | Weaver et al. |
| 5,446,672 A | 8/1995 | Boldys |
| 5,450,321 A | 9/1995 | Crane |
| 5,450,537 A | 9/1995 | Hirai et al. |
| 5,455,777 A | 10/1995 | Fujiyama et al. |
| 5,459,675 A | 10/1995 | Gross et al. |
| 5,463,768 A | 10/1995 | Cuddihy et al. |
| 5,463,769 A | 10/1995 | Tate et al. |
| 5,465,321 A | 11/1995 | Smyth |
| 5,473,532 A | 12/1995 | Unno et al. |
| 5,479,574 A * | 12/1995 | Glier et al. ...................... 706/25 |
| 5,481,647 A | 1/1996 | Brody et al. |
| 5,481,674 A | 1/1996 | Mahavadi |
| 5,486,997 A | 1/1996 | Reismiller et al. |
| 5,495,168 A | 2/1996 | de Vries |
| 5,496,450 A | 3/1996 | Blumenthal et al. |
| 5,500,940 A | 3/1996 | Skeie |
| 5,502,543 A | 3/1996 | Aboujaoude |
| 5,526,446 A | 6/1996 | Adelson et al. |
| 5,539,638 A | 7/1996 | Keeler et al. |
| 5,544,320 A | 8/1996 | Konrad |
| 5,548,528 A | 8/1996 | Keeler et al. |
| 5,553,239 A | 9/1996 | Heath et al. |
| 5,559,710 A | 9/1996 | Shahraray et al. |
| 5,561,431 A | 10/1996 | Peele et al. |
| 5,566,092 A | 10/1996 | Wang et al. |
| 5,574,387 A | 11/1996 | Petsche et al. |
| 5,579,232 A | 11/1996 | Tong et al. |
| 5,586,066 A | 12/1996 | White et al. |
| 5,596,507 A | 1/1997 | Jones et al. |
| 5,600,726 A | 2/1997 | Morgan et al. |
| 5,602,733 A | 2/1997 | Rogers et al. |
| 5,608,845 A | 3/1997 | Ohtsuka et al. |
| 5,610,339 A | 3/1997 | Haseley et al. |
| 5,611,052 A | 3/1997 | Dykstra et al. |
| 5,612,886 A | 3/1997 | Weng |
| 5,617,342 A | 4/1997 | Elazouni |
| 5,623,109 A | 4/1997 | Uchida et al. |
| 5,629,872 A | 5/1997 | Grosse et al. |
| 5,629,878 A | 5/1997 | Kobrosly |
| 5,629,879 A | 5/1997 | Lelle |
| 5,638,413 A | 6/1997 | Uematsu et al. |
| 5,640,103 A | 6/1997 | Petsche et al. |
| 5,644,463 A | 7/1997 | El-Sharkawi et al. |
| 5,657,245 A | 8/1997 | Hecht et al. |
| 5,663,894 A | 9/1997 | Seth et al. |
| 5,668,944 A | 9/1997 | Berry |
| 5,671,635 A | 9/1997 | Nadeau et al. |
| 5,680,409 A | 10/1997 | Qin et al. |
| 5,680,541 A | 10/1997 | Kurosu et al. |
| 5,682,317 A | 10/1997 | Keeler et al. |
| 5,689,416 A | 11/1997 | Shimizu et al. |
| 5,689,434 A | 11/1997 | Tambini et al. |
| 5,696,907 A | 12/1997 | Tom |
| 5,699,403 A | 12/1997 | Ronnen |
| 5,704,029 A | 12/1997 | Wright, Jr. |
| 5,708,780 A | 1/1998 | Levergood et al. |
| 5,710,723 A | 1/1998 | Hoth et al. |
| 5,714,683 A | 2/1998 | Maloney |
| 5,727,144 A | 3/1998 | Brady et al. |

| Patent No. | Date | Inventor(s) |
|---|---|---|
| 5,727,163 A | 3/1998 | Bezos |
| 5,737,228 A | 4/1998 | Ishizuka et al. |
| 5,745,382 A | 4/1998 | Vilim et al. |
| 5,745,654 A | 4/1998 | Titan |
| 5,748,469 A | 5/1998 | Pyotsia |
| 5,748,496 A | 5/1998 | Takahashi et al. |
| 5,751,580 A | 5/1998 | Chi |
| 5,753,805 A | 5/1998 | Maloney |
| 5,754,451 A | 5/1998 | Williams |
| 5,754,965 A | 5/1998 | Hagenbuch |
| 5,757,309 A | 5/1998 | Brooks et al. |
| 5,761,090 A | 6/1998 | Gross et al. |
| 5,761,640 A | 6/1998 | Kalyanswamy et al. |
| 5,764,509 A | 6/1998 | Gross et al. |
| 5,774,379 A | 6/1998 | Gross et al. |
| 5,774,882 A | 6/1998 | Keen et al. |
| 5,774,883 A | 6/1998 | Andersen et al. |
| 5,784,285 A | 7/1998 | Tamaki et al. |
| 5,787,138 A | 7/1998 | Ocieczek et al. |
| 5,790,977 A | 8/1998 | Ezekiel |
| 5,792,072 A | 8/1998 | Keefe |
| 5,796,633 A | 8/1998 | Burgess et al. |
| 5,797,133 A | 8/1998 | Jones et al. |
| 5,799,043 A | 8/1998 | Chang et al. |
| 5,802,509 A | 9/1998 | Maeda et al. |
| 5,805,442 A | 9/1998 | Crater et al. |
| 5,808,903 A | 9/1998 | Schiltz et al. |
| 5,809,490 A | 9/1998 | Guiver et al. |
| 5,817,958 A | 10/1998 | Uchida et al. |
| 5,818,716 A | 10/1998 | Chin et al. |
| 5,819,029 A | 10/1998 | Edwards et al. |
| 5,819,236 A | 10/1998 | Josephson |
| 5,819,291 A | 10/1998 | Haimowitz et al. |
| 5,822,212 A | 10/1998 | Tanaka et al. |
| 5,832,465 A | 11/1998 | Tom |
| 5,841,677 A | 11/1998 | Yang et al. |
| 5,842,157 A | 11/1998 | Wehhofer et al. |
| 5,845,230 A | 12/1998 | Lamberson |
| 5,845,627 A | 12/1998 | Olin et al. |
| 5,848,396 A | 12/1998 | Gerace |
| 5,864,773 A | 1/1999 | Barna et al. |
| 5,867,118 A | 2/1999 | McCoy et al. |
| 5,870,721 A | 2/1999 | Norris |
| 5,878,403 A | 3/1999 | DeFrancesco et al. |
| 5,886,913 A | 3/1999 | Marguinaud et al. |
| 5,895,177 A | 4/1999 | Iwai et al. |
| 5,905,989 A | 5/1999 | Biggs |
| 5,909,368 A | 6/1999 | Nixon et al. |
| 5,911,135 A | 6/1999 | Atkins |
| 5,913,911 A | 6/1999 | Beck et al. |
| 5,917,428 A | 6/1999 | Discenzo et al. |
| 5,921,099 A | 7/1999 | Lee |
| 5,930,156 A | 7/1999 | Kennedy |
| 5,930,776 A | 7/1999 | Dykstra et al. |
| 5,930,779 A | 7/1999 | Knoblock et al. |
| 5,933,352 A | 8/1999 | Salut |
| 5,933,818 A | 8/1999 | Kasravi et al. |
| 5,940,298 A | 8/1999 | Pan et al. |
| 5,940,811 A | 8/1999 | Norris |
| 5,940,812 A | 8/1999 | Tengel et al. |
| 5,943,634 A | 8/1999 | Piety et al. |
| 5,946,661 A | 8/1999 | Rothschild et al. |
| 5,946,662 A | 8/1999 | Ettl et al. |
| 5,949,678 A | 9/1999 | Wold et al. |
| 5,950,147 A | 9/1999 | Sarangapani et al. |
| 5,950,179 A | 9/1999 | Buchanan et al. |
| 5,956,487 A | 9/1999 | Venkatraman et al. |
| 5,956,664 A | 9/1999 | Bryan |
| 5,960,411 A | 9/1999 | Hartman et al. |
| 5,960,435 A | 9/1999 | Rathmann et al. |
| 5,961,560 A | 10/1999 | Kemner |
| 5,963,884 A | 10/1999 | Billington et al. |
| 5,966,699 A | 10/1999 | Zandi |
| 5,970,430 A | 10/1999 | Burns et al. |
| 5,970,478 A | 10/1999 | Walker et al. |
| 5,987,399 A | 11/1999 | Wegerich et al. |
| 5,987,434 A | 11/1999 | Libman |
| 5,991,525 A | 11/1999 | Shah et al. |
| 5,991,735 A | 11/1999 | Gerace |
| 5,993,041 A | 11/1999 | Toba |
| 5,995,911 A | 11/1999 | Hart |
| 5,995,916 A | 11/1999 | Nixon et al. |
| 5,995,947 A | 11/1999 | Fraser et al. |
| 6,000,832 A | 12/1999 | Franklin et al. |
| 6,002,839 A | 12/1999 | Keeler et al. |
| 6,006,192 A | 12/1999 | Cheng et al. |
| 6,006,260 A | 12/1999 | Barrick, Jr. et al. |
| 6,009,381 A | 12/1999 | Ono |
| 6,013,108 A | 1/2000 | Karolys et al. |
| 6,014,598 A | 1/2000 | Duyar et al. |
| 6,014,645 A | 1/2000 | Cunningham |
| 6,021,396 A | 2/2000 | Ramaswamy et al. |
| 6,023,507 A | 2/2000 | Wookey |
| 6,026,348 A | 2/2000 | Hala |
| 6,029,097 A | 2/2000 | Branicky et al. |
| 6,029,149 A | 2/2000 | Dykstra et al. |
| 6,029,890 A | 2/2000 | Austin |
| 6,041,287 A | 3/2000 | Dister et al. |
| 6,049,738 A | 4/2000 | Kayama et al. |
| 6,049,741 A | 4/2000 | Kawamura |
| 6,049,827 A | 4/2000 | Sugauchi et al. |
| 6,064,916 A | 5/2000 | Yoon |
| 6,076,048 A | 6/2000 | Gunther et al. |
| 6,076,088 A | 6/2000 | Paik et al. |
| 6,088,626 A | 7/2000 | Lilly et al. |
| 6,088,686 A | 7/2000 | Walker et al. |
| 6,100,901 A | 8/2000 | Mohda et al. |
| 6,104,965 A | 8/2000 | Lim et al. |
| 6,105,007 A | 8/2000 | Norris |
| 6,107,919 A | 8/2000 | Wilks et al. |
| 6,108,616 A | 8/2000 | Borchers et al. |
| 6,110,214 A | 8/2000 | Klimasauskas |
| 6,112,190 A | 8/2000 | Fletcher et al. |
| 6,115,653 A | 9/2000 | Bergstrom et al. |
| 6,119,111 A | 9/2000 | Gross et al. |
| 6,125,351 A | 9/2000 | Kauffman |
| 6,128,540 A | 10/2000 | Van Der Vegt et al. |
| 6,128,543 A | 10/2000 | Hitchner |
| 6,131,076 A | 10/2000 | Stephan et al. |
| 6,141,647 A | 10/2000 | Meijer et al. |
| 6,141,674 A | 10/2000 | Unkrich et al. |
| 6,144,893 A | 11/2000 | Van Der Vegt et al. |
| 6,181,975 B1 | 1/2001 | Gross et al. |
| 6,182,022 B1 | 1/2001 | Mayle et al. |
| 6,202,038 B1 | 3/2001 | Wegerich et al. |
| 6,236,908 B1 | 5/2001 | Cheng et al. |
| 6,240,372 B1 | 5/2001 | Gross et al. |
| 6,245,517 B1 | 6/2001 | Chen et al. |
| 6,246,972 B1 | 6/2001 | Klimasauskas |
| 6,272,449 B1 | 8/2001 | Passera |
| 6,278,962 B1 | 8/2001 | Klimasauskas et al. |
| 6,289,330 B1 | 9/2001 | Jannarone |
| 6,327,574 B1 | 12/2001 | Kramer et al. |
| 6,331,864 B1 | 12/2001 | Coco et al. |
| 6,331,964 B1 | 12/2001 | Barone |
| 6,356,857 B1 | 3/2002 | Qin et al. |
| 6,393,373 B1 | 5/2002 | Duyar et al. |
| 6,418,431 B1 | 7/2002 | Mahajan et al. |
| 6,424,958 B1 | 7/2002 | Pappalardo et al. |
| 6,480,810 B1 | 11/2002 | Cardella et al. |
| 6,502,082 B1 | 12/2002 | Toyama et al. |
| 6,519,552 B1 | 2/2003 | Sampath et al. |
| 6,522,978 B1 | 2/2003 | Chen et al. |
| 6,526,356 B1 | 2/2003 | DiMaggio et al. |
| 6,532,426 B1 | 3/2003 | Hooks et al. |
| 6,539,343 B2 | 3/2003 | Zhao et al. |
| 6,553,334 B2 | 4/2003 | Gross et al. |
| 6,556,939 B1 | 4/2003 | Wegerich |
| 6,567,752 B2 | 5/2003 | Cusumano et al. |
| 6,567,795 B2 | 5/2003 | Alouani et al. |
| 6,587,737 B2 | 7/2003 | Voser et al. |
| 6,590,362 B2 | 7/2003 | Parlos et al. |
| 6,591,166 B1 | 7/2003 | Millett et al. |
| 6,591,296 B1 | 7/2003 | Ghanime |
| 6,609,036 B1 * | 8/2003 | Bickford .................. 700/30 |
| 6,609,212 B1 | 8/2003 | Smith |
| 6,625,569 B2 | 9/2003 | James et al. |
| 6,678,639 B2 | 1/2004 | Little et al. |

| | | | |
|---|---|---|---|
| 6,687,654 B2 | 2/2004 | Smith, Jr. et al. | |
| 6,731,990 B1 | 5/2004 | Carter et al. | |
| 6,751,575 B2 | 6/2004 | Lenz et al. | |
| 6,775,641 B2 | 8/2004 | Wegerich et al. | |
| 6,804,628 B2 | 10/2004 | Gross et al. | |
| 6,826,552 B1 | 11/2004 | Grosser et al. | |
| 6,839,660 B2 | 1/2005 | Eryurek et al. | |
| 6,853,920 B2 | 2/2005 | Hsiung et al. | |
| 6,859,739 B2 | 2/2005 | Wegerich et al. | |
| 6,876,943 B2 | 4/2005 | Wegerich | |
| 6,892,163 B1 | 5/2005 | Herzog et al. | |
| 6,898,469 B2 | 5/2005 | Bickford | |
| 6,898,554 B2 | 5/2005 | Jaw et al. | |
| 6,917,839 B2 | 7/2005 | Bickford | |
| 6,941,287 B1 | 9/2005 | Vaidyanathan et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 6,999,899 B2 | 2/2006 | Gross et al. | |
| 7,016,816 B2 | 3/2006 | Mott | |
| 7,027,953 B2 | 4/2006 | Klein | |
| 7,050,875 B2 | 5/2006 | Cribbs et al. | |
| 7,085,675 B2 | 8/2006 | Wegerich | |
| 7,089,154 B2 | 8/2006 | Rasmussen et al. | |
| 7,142,990 B2 | 11/2006 | Bouse et al. | |
| 7,233,886 B2 * | 6/2007 | Wegerich et al. | 703/2 |
| 7,308,385 B2 | 12/2007 | Wegerich et al. | |
| 7,373,283 B2 | 5/2008 | Herzog et al. | |
| 7,386,426 B1 | 6/2008 | Black et al. | |
| 7,403,869 B2 | 7/2008 | Wegerich et al. | |
| 7,409,320 B2 | 8/2008 | Wegerich | |
| 7,539,597 B2 | 5/2009 | Wegerich et al. | |
| 7,621,141 B2 | 11/2009 | McCormick et al. | |
| 7,640,145 B2 | 12/2009 | Wegerich et al. | |
| 7,739,096 B2 | 6/2010 | Wegerich et al. | |
| 7,941,701 B2 | 5/2011 | Wegerich et al. | |
| 2002/0065698 A1 | 5/2002 | Schick | |
| 2002/0183971 A1 | 12/2002 | Wegerich et al. | |
| 2003/0028269 A1 | 2/2003 | Spriggs | |
| 2003/0040878 A1 | 2/2003 | Rasmussen | |
| 2003/0055666 A1 | 3/2003 | Roddy | |
| 2003/0060808 A1 | 3/2003 | Wilk | |
| 2003/0093521 A1 | 5/2003 | Schlonski et al. | |
| 2003/0109951 A1 | 6/2003 | Hsiung | |
| 2003/0125248 A1 | 7/2003 | Hair | |
| 2003/0126258 A1 | 7/2003 | Conkright | |
| 2003/0139908 A1 | 7/2003 | Wegerich et al. | |
| 2004/0019406 A1 | 1/2004 | Wang | |
| 2004/0088093 A1 | 5/2004 | Yao | |
| 2005/0021187 A1 | 1/2005 | Wang | |
| 2005/0021212 A1 | 1/2005 | Gayme | |
| 2005/0027400 A1 | 2/2005 | Wang | |
| 2005/0096757 A1 | 5/2005 | Frerichs | |
| 2005/0210337 A1 | 9/2005 | Chester | |
| 2005/0261837 A1 | 11/2005 | Wegerich et al. | |
| 2008/0071501 A1 | 3/2008 | Herzog | |
| 2008/0215291 A1 | 9/2008 | Wegerich | |
| 2009/0043405 A1 | 2/2009 | Chester | |
| 2009/0043467 A1 | 2/2009 | Filev | |

FOREIGN PATENT DOCUMENTS

| | | |
|---|---|---|
| JP | 61160111 | 7/1986 |
| JP | 02004300 | 9/1990 |
| JP | 05126980 | 5/1993 |
| JP | 06274784 | 9/1994 |
| JP | 06278179 | 10/1994 |
| JP | 7243876 | 9/1995 |
| JP | 08220279 | 8/1996 |
| JP | 09166483 | 6/1997 |
| JP | 11311591 | 9/1999 |
| JP | 06161982 | 6/2006 |
| WO | 9504878 | 2/1995 |
| WO | 9722073 | 6/1997 |
| WO | 0067412 | 11/2000 |
| WO | 0167262 | 9/2001 |
| WO | 0235299 | 5/2002 |
| WO | 02057856 | 7/2002 |
| WO | 02086726 | 10/2002 |
| WO | 2005038545 | 4/2005 |

OTHER PUBLICATIONS

Cavallo, A., De Maria, G., Leccia, E., and Setola, R., "Robust Vibration Control of a DC9 Aircraft Frame," Proceedings of the 37th IEEE, Conference on Decision & Control, Dec. 1998, pp. 4039-4044, Tampa, Florida.

Garvey, Dustin R., Hines, J. Wesley, "Robust Distance Measures for On-Line Monitoring: Why Use Euclidean," 7th International Fuzzy Logic and Intelligent Technologies in Nuclear Science (FLINS) Conference on Applied Artificial Intelligence, Aug. 2006, 8 pages, Genova, Italy.

Hines, J. W., Seibert, R., "Technical Review of On-Line Monitoring Techniques for Performance Assessment," publication prepared for the Division of Engineering Technology, Office of the Nuclear Regulatory Commission, Jan. 2006, pp. 1-127, Washington, D.C.

Hines, J. Wesley, and Garvey, Dustin, "An Autoassociative Empirical Modeling Toolbox for On-Line Monitoring," 18th International Congress and Exhibition on Condition Monitoring and Diagnostic Engineering Management, Aug. 2005, 9 pages, Cranfield, Bedfordshire, United Kingdom.

Shankar, R., "On-Line Monitoring of Instrument Channel Performance," EPRI Technical Report (TR) 104965-R1, Sep. 2000, pp. 1-370, Palo Alto, California.

Black, Chris L., J. Wesley Hines, and Robert E. Uhlrig, Online Implementation of Instrument Surveillance and Calibration Verification Using Autoassociative Neural Networks, published in the proceedings of Maintenance and Reliability Conference (MARCON 97), May 20-22, 1997.

Black, Christopher L.; Uhrig, Robert E.; Hines, J. Wesley; "System Modeling and Instrument Calibration Verification with a Nonlinear State Estimation Technique", Maintenance and Reliability Conference Proceedings, May 12-14, 1998.

Griebenow et al. "Applied Pattern Recognition for Plant Monitoring and Data Validation." Presented at the Fifth International Joint ISA POWID/EPRI Controls and Instrumentation Conference, La Jolla, California, Jun. 19-21, 1995. (11 pp.).

Gross, K.C., et al, "Sequential Probability Ratio Test for Nuclear Plant Component Surveillance", Nuclear Technology, vol. 93, p. 131, Feb. 1991.

Gross, K.C., R.M. Singer, S.W. Wegerich, J.P. Herzog, R. VanAlstine, and F. Bockhorst, "Application of a Model-based Fault Detection System to Nuclear Plant Signals", presented at the International Conference on Intelligent System Application to Power Systems (ISAP '97), Jul. 6-10, 1996, Seoul, Korea (pp. 66-70).

Harris, T.J. et al., "Empirical Models for Intelligent Data Validation", Instrumentation Controls, and Automation in the Power Industry; Proceedings of the . . . Power Instrumentation Symposium, Jun. 1992 vol. 35 (pp. 311-326).

Herzog, J. P., Y. Yue, and R. L. Bickford, "Dynamics Sensor Validation for Reusable Launch Vehicle Propulsion", presented at the 34th AIAA/ASME/SAE/ASEE Joint Propulsion Conference & Exhibit, Cleveland, Ohio, Jul. 13-15, 1998, AIAA-98-3604 (12 pp.).

Herzog, S. W. Wegerich, K. C. Gross, and F. K. Bockhorst, "MSET Modeling of Crystal River-3 Venturi Flow Meters", 6th International Conference on Nuclear Engineering, ICONE-6169, May 10-14, 1998, Copyright. 1998 ASME (12 pp).

Hines et al., "Plant Wide Sensor Calibration Monitoring", Proceedings of the 1996 IEEE International Symposium on Intelligent Control, Sep. 1996, pp. 378-383.

Humenik, K., and K. C. Gross "Using Fourier Series Methods to Reduce Correlation of Nuclear Power Reactor Data", Nuclear Science and Engineering, vol. 112, Oct. 1992, pp. 127-135.

Humenik, K., et al, "Sequential Probability Ratio Tests for Reactor Signal Validation and Sensor Surveillance Applications", Nuclear Science and Engineering, vol. 105, Aug. 1990, pp. 383-390.

Mott, J. E., R. W. King, L. R. Monson, D. L. Olson, and J. D. Staffon, "A Universal, Fault-Tolerant, Non-Linear Analytic Network for Modeling and Fault Detection," Proceedings of the 8th Power Plant dynamics, Control & Testing Symposium, Knoxville, Tennessee, May 27-29, 1992 (14pp.).

Singer, Ralph M., Kenny C. Gross, James P. Herzog, Ronald W. King, and Stephen Wegerich, "Model-Based Nuclear Power Plant Monitoring and Fault Detection: Theoretical Foundations", presented at the International Conference on Intelligent System Application to Power Systems (ISAP '97), Jul. 6-10, 1996, Seoul, South Korea (pp. 60-65).

Singer, Ralph M., Kenny C. Gross, and Stephan Wegerich,"A Fault-Tolerant Sensory Diagnostic System for Intelligent Vehicle Application" by, presented at the IEEE International Symposium on Intelligent Vehicles, Detroit, MI, Sep. 25-26, 1995 (7pp.).

Wilson, D. Randall, et al., "Reduction Techniques for Instance-Based Learning Algorithms", Mar. 2000, Machine Learning, vol. 38, No. 3, pp. 1-32.

Wegerick S.W. et al. Nonparametric Modeling of Vibration Signal Features for Equipment Health Monitoring. 2003 IEEE Aerospace Conference. Mar. 2003, vol. 7, pp. 3113-3121.

Abstract of paper entitled Analytical Enhancements of Automotive Sensory System Reliability, publicly available before Apr. 30, 1998.

An International Search Report dated May 8, 2008, from the International Bureau in corresponding International (PCT) Application No. PCT/US07/078906.

Aynur A. Dayanik et al., Binning: Converting Numerical Classification, Jun. 2000, Seventeenth International Conference on Machine Learning, eight unnumbered pages.

Caldwell et al—Remote Instrument Diagnosis on the Internet, 7 pgs, 1998.

Chen Chi-hau; "Statistical Pattern Recognition", 1973, Spartan Books.

D. Psaltis et al., "A multilayered neural network controller". 1988, IEEE Control Systems Magazine, vol. 8, issue 2, pp. 17-21.

D.J. Smith, "Integrating Power Plant Controls Increases Availability and Reduces Costs," Power Engineering, vol. 98, No. 9, pp. 25-29, Sep. 1994, (bibliographic citation and Abstract, pp. 11-12 of DIALOG File 2:INSPEC report).

David B, Skalak, "Prototype and Feature Selection by Sampling and Random Mutation Hill Climbing Algorithms", 1994, International Conference on Machine Learning, nine unnumbered pages.

David B. Skalak, "Prototype Selection for Composite Nearest Neighbor Classifiers", May 1997, University of Massachusetts Amherst, pp. 1-259.

David M.J. Tax and Robert P.W. Duin, "Support vector domain description", 1999, Pattern Recognition Letters, vol. 20, pp. 1191-1199.

Dreze, X. Zufryden. F., Testing Web Site Design and Promotional Content, Journal of Advertising Research, 1997, vol. 37; No. 2, pp. 77-91.

Early Detection of Signal or Process Variation in the Co-Generational Plant at US Steel Gary Works by Neiman et al; Aug. 19, 2004, pp. 8.

F. Hussain et al., "Discretization: An Enabling Technique", Jun. 1999, The National University of Singapore, pp. 1-27.

Freund, Rudolf J.; Wilson, William J,; "Statistical Methods", 1993, Academic Press.

Goodwin, G.; "Evaluating the Performance of Virtual Sensors"; Proceedings Information, Decision and Control 1999; Feb. 8-10, 1999; pp. 5-12.

H.R. DePold and F.D., Gass, "The Application of Expert Systems and Neural Networks to Gas Turbine Prognostics and Diagnostics," Tranactions of the ASME, Jornal of Engineering for Gas Turbines and Power, vol. 121, No.4, pp. 607-612, Oct. 1999, (Bibliographic citation and Abstract, pp. 7-8 of DIALOG(R) File 2: INSPEC report).

Hansen E.J., and M.B. Caudill, "Similarity Based Regression: Applied Advanced Pattern Recognition for Power Plant Analysis," presented at the 1994 EPRI Heat Rate Improvement Conference (9 pp.).

Hansen et al, "Appiled Pattern Recognition for Plant Monitoring and Data Validation" Joint ISA POWID/EPRI Controls aind Instrumentation Conference Jun. 19-21, 1995 pp. 11.

Himmelblau et al., "On-Line Sensor Validation of Single Sensors Using Artifical Neural Networks", Proceedings of the American Control Conference, Jun. 1995, pp. 766-770.

http://mathworld.wolfram.com/DistributionFunction.html. Jul. 21, 2004.

J.A. Walkensteubm W.B. Pardo, H.S. Robertson, and M. Monti, "An Inexpensive Hybrid Video Imaging System," Review of Scientific Instruments, vol. 66, No. 11, pp. 5385-5386, Nov. 1995. (biblicgraphic citation and Abstract, pp. 10-11 of DILOG(R) File 2:INSPEC report).

Jain, A. K.; Murty, M. N.; Flynn P. J.; "Data Clustering: A Review", ACM Computing Surveys vol. 31, No. 3, Sep. 1999.

James Doughtery at al, "Supervised and Unsupervised Discretization of Continuous Features", 1995, in "Machine Learning: Proceedings of the Twelfth International Conference" ed. Armand Prieditis and Stuart Russell, Morgan Kaufmann Publishers, nine unnumbered pages.

Jaw. L.C. et al. Anomaly Detection and Reasoning with Embedded Physical Model, IEEE 2002 Aerospace Conference. Mar. 2002, vol, 6, pp. 3073-3081.

Kah-Kay Sung et al., "Example-Base Learning for View-Based Human Face Detection", IEEE Transactions on Pattern Analysis and Machine Intelligence, vol. 20, No. 1, pp. 39-51.

Keller, May 1994, "Three Neural Network Based, Sensor Systems for Environmental Monitoring", p. 377-382.

Kim ;Y., et al."Analysis and Proccessing of Shaft Angular Velocity Signals in Rotating Machinery for Diagnostic Applications," by Y. Kim, at al, IEEE Intl, Conf, on Acoustics, Speech, and Signal Processing 1995 (vol. 5, pp. 2971-2974.).

Kris Popat and Rosalind W. Picard, "Cluster-Based Probability Model and its Application to Image and Texture Processing", Feb. 1997, IEEE Transactions on Image Processing, vol. 6, No. 2, pp. 268-284.

Lehoczky, J.P., "Real-time queueing network Theory"; Real-Time Systems Symposium, 1997. Proceedings., The 18th IEEE Dec. 2-5, 1997 pp. 58-67 [retrieved from IEEE database on May 14, 2009].

Long, T; Hanzesrack, E; Bynum, W; "Sensor Fusion and Failure Detection Using Virtual Sensors", Proceedings of the 1999 American Control Conference: vol. 4; Jun. 1999; pp. 2417-2421.

M. Feridun, "Diagnosis of Connectivity Problems in the Internet," Integrated Network Management, II. Proceedings of the IFIP TC6/WG6 Second International Symposium, pp. 691-701, 1991. (bibliographic citation and Abstract, pp. 12-13 DIALOG(R) File 2:INSPEC report).

M. Furuya, T. Fukumoto, and T. Sekozawa, "WWW-Browser-Based Monitoring System For Industrial Plants," Conference of the IEEE Industiral Electronics Society, Part vol. 3, pp. 1146-1241, 1999. (Bibliographic citation and Abstract 2-3 of Dialog(R) File 2:INSPEC report).

M. Tarsala, "H-P. Computers Will Fix Themselves," CBS MarketWatch.com, Jan. 18, 2000. two Pages from the internet discussing Hewlett-Packard's plan for remote Internet access to diagnose and fix problems.

Maloney, Peter., and Peter M. Olin,"Pneumatic and Thermal State Estimators for Production Engine Control and Diagnostics" by SAE Technical Paper Series 980517, International Congress and Exposition, Feb. 23-26, 1996, Copyright 1998 Society of Automotive Engineers, Inc. (ISSN 0148-7191).

Miron et al., "Fault-Tolerence Improvement for a MSET Model of the Crystal River-3 Feedwater Flow System", 1998 IEEE Nuclear Science Symposium, Nov. 1998, pp. 993-994.

ModelWare.TM. Product Review by Robert O. Flori, reprinted from Computerized Investing, No. 5, Sep./Oct. 1992, vol. XI, No. 5, copyright by The American Association of Individual Investors (pp. 8-10).

Nieman at al—Early Detection of Signal or Process Variation in the Co-Generation Plant at US Steel, Gary Works, pp. 8, 2004.

0livier Chapelle et al., "Support Vector Machines, for Histogram-Based Classification", Sep. 1999, IEEE Transactions on Neural Networks, vol. 10, No. 5, pp. 1056-1064.

Orsagh, Rolf et al. "An Internet-based Machinery Health Monitoring System", MFPT Committee Meeting, Virginia Beach, VA, May, 2000.

O'Sullivan, Paul J., "Applicalion of a New Technique For Modeling System Behavior", presented at the ISA Symposium, Edmonton, Alberta, May 1, 1991, COPYRGT, Copyright 1991 Instrument Society of America (21 pp.).

Performance Consulting Services, "ACM Workstation User's Guide", Version 2001, Incorporated, Copyright 1994-2001.

R.A. Errath and J.J. Dominguez, "Remote Drive Condition Monitoring," 1999 IEEE/ISA/PCA Cement Industry Technical Conference, pp. 31-48, 1999. (Bibliographic citation and Abstract. pp. DIALOG(R) File 2: INSPEC report).

Rajan et al, Jan. 1998; "Machine Learning Algorithm for Fault Diagnosis in Analog Circuits", p. 1874-1879.

Robertson, Douglas Galen, Ph.D., "Development and statistical interpretation of tools for nonlinear estimation," Auburn University, 1996, 116 pages, AAT 9700752.

Rubinstein, Reuven Y.; "Simulation and the Monte Carlo Method", 1981, John Wiley & Sons.

Rudolph J. Freund and William J. Wilson, Statistical Methods, 1993, Academic Press, pp, 8-15 and 574-575.

S.J. Julier and J.K. Uhlmann, A New Extension of the Kalman Filter to Nonlinear Systems, In: Proc. AeroSense: The 11th International Symposium on Aerospace/Defence Sensing, Simulation and Controls (1997).

Sairam Valluri et al., Nonlinear State Estimation in the Presence of Multiple Steady States, Ind. Eng. Chem. Res. 1996, 35, 2645-2659.

SmartSignal web page downloaded from http://web.archive.org/web/19990209022642/http://www.smartsignal.com on May 5, 2010. SmartSignal, trademark with text Feb. 1999. p. 1-16.

Smith, J. Using Data Mining for Plant Maintenance, Plant Engineering, Dec. 2002, vol. 56, No. 12, pp. 26-30.

Sowizral, H. "Virtual Sensors"; Proceedings SPIE International Society for Optical Engineering; vol. 2409; Feb. 7-9, 1995; pp. 246-254.

Spatial Tech 2004 "For the First Time, Oil and Gas Lease Site Operators Will be Notified of Equipment Problems Before Costly Shutdowns" Dec. 2000. p. 1-3.

Spoelder, H; "Virtual Instrumentation and Virtual Environments" IEEE Instrumentation and Measurement Magazine; vol. 2, Issue 3; Sep. 1999; pp. 14-19.

Srinivas Tatiraju et al., Multi-Rate Nonlinear State Estimation and Parameter Estimation in a Bioreactor, Biotechnology and Bioengineering, vol. 63, No. 1, Apr. 5, 1999.

Tarassenko, L. et al. Novelty Detection in Jet Engines, IEE Colloquium on Condition Monitoring: Machinery, External Structures and Health, Apr. 1999, pp. 4/1-4/5.

Tatiraju et al—Multi-Rate Nonlinear State and Parameter Estimation in a Bioreactor, 11 pgs, 1998.

Teranet IA Incorporated, "ModelWare.TM. User's Manual", Copyright 1992.

Tucker, Ken "Modelware a New Approach to Prediction" Vendor's Forum. Jan./Feb. 1993 (pp. 14-15, 30).

Understanding Electronic Commerce, David Kosiur, 1997, Microsoft Press, a Division of Microsoft Corporation.

Various; "IEEE Instrumentation and Measurement Technology Conference Sensing, Processing, Networking"; Instrumentation and Measurement Technology Conference; vol. 2; May 19-21, 1997; pp. i-xxiii.

Wilks et al—Monitoring your Equipment by Wilks et al pp. 14, 2004.

Wong, Man To; Geva, S.; Orlowski, M.; "Pattern recognition from neural network with fuctional dependency preprocessing", 1997, Proceedings of IEEE Speech and Technologies for Computing and Telecommunications.

* cited by examiner

ROBUST DISTANCE MEASURES FOR ON-LINE MONITORING

RELATED APPLICATION DATA

This application claims priority to provisional application Ser. No. 60/870,268, filed Dec. 15, 2006, the disclosure of which is hereby incorporated by reference herein in its entirety.

BACKGROUND OF THE INVENTION

Traditionally, the calibration of safety critical nuclear instrumentation has been performed at each refueling cycle. However, many nuclear plants have moved toward condition-directed rather than time-directed calibration. This condition-directed calibration is accomplished through the use of on-line monitoring which commonly uses an autoassociative predictive modeling architecture to assess instrument channel performance. An autoassociative architecture predicts a group of correct sensor values when supplied with a group of sensor values that is corrupted with process and instrument noise, and could also contain faults such as sensor drift or complete failure.

In the U.S. nuclear power industry, millions of dollars are spent annually on the calibration of instrument chains that are performing within the required specifications. For the past twenty years, several nuclear utilities have investigated methods to monitor the calibration of safety critical process instruments. In 2000, the U.S. Nuclear Regulatory Commission (NRC) issued a safety evaluation report (SER) on an EPRI submitted Topical Report (TR) 104965, "On-Line Monitoring of Instrument Channel Performance". This SER concluded that the generic concept of on-line monitoring (OLM) for tracking instrument performance as discussed in the topical report is acceptable. However, additional requirements were identified that must be addressed by plant specific license amendments if the calibration frequency of safety-related instrumentation is to be relaxed. Since the applicability of an OLM system is directly related to the ability of an empirical model to correctly predict sensor values when supplied faulty data, methods must be developed to ensure that robust empirical models can be developed.

The autoassociative architecture for predicting correct sensor values has also been adapted for use in equipment fault detection and health monitoring. Accordingly, it is known to provide a nonparametric empirical model such as a kernel regression model or a similarity-based model that generates estimates of sensor values responsive to input of measurements of those sensor values in real-time. The estimates are subtracted from the measured values to provide residuals, which are used to detect deviations indicative of incipient equipment failure. Such approaches are known from, for example, U.S. Pat. No. 4,937,763 to Mott; and in U.S. Pat. No. 5,764,509 to Gross et al. In these approaches, a kernel function incorporating a distance function is used to compare the measured values of the sensors arranged as an observation vector, to a set of reference observations. The kernel function, also called a similarity operator, returns a scalar value indicative of the similarity of the input observation vector to each of the reference observation vectors, and these scalar values are used in generating an estimate observation of the sensor values as an adaptive linear combination of at least some of the reference observations. Kernel regression and similarity-based modeling differ in the details of how the adaptive linear combination is formed; however the kernel function is used in both instances. The scalar value or similarity value of the kernel function typically is designed to range between zero and one, where a value of one indicates the compared vectors are identical, and values approaching zero indicate increasing dissimilarity or distance between the vectors.

One of the drawbacks of the kernel functions in use is susceptibility to outlier inputs, especially when the kernel function is executed on the elements of the compared vectors. In such a case, the kernel function compares individual like elements of the vectors, and generates a scalar comparison outcome for each element, then combines those to form an observation level scalar value. When a particular sensor reading is very different from the sensor reading in a reference observation, the observation-level kernel result can be dominated by the outlier sensor value, resulting in a reduced similarity scalar value for the comparison of the input vector to the reference observation in question than might otherwise be implied by the other sensor readings.

SUMMARY OF THE INVENTION

The invention provides improved kernel-based model performance with more robust distance metrics, for sensor calibration and equipment health monitoring. Accordingly, robust distance measures for use in nonparametric, similarity based models are disclosed. The alternative robust distance functions have performance advantages for the common task of sensor drift detection. In particular, a robust Euclidean distance function according to the invention produces significant robustness improvements in nonparametric, similarity based models, such as kernel regression and the multivariate state estimation technique (MSET).

The invention can be used in software for monitoring the health of equipment and sensors, especially for nonparametric empirical model based systems. Accordingly, equipment is instrumented with sensors for determining a variety of physical or statistical measurements of equipment performance; the sensor data is provided to the software which generates estimates of the sensor data using the nonparametric empirical model; and the estimates are compared to the measured values to determine if an incipient deviation exists. Residuals can be processed through a variety of alerting, trending and pattern recognition techniques, to provide an autonomous software system for annunciation of probable and/or incipient equipment failures. People responsible for maintaining or operating the equipment can rely on the software to call out exceptional conditions in the equipment requiring intervention.

DETAILED DESCRIPTION OF THE INVENTION

An empirical model's architecture may be either defined by a set of parameters and functional relationships (parametric) or a set of data and algorithmic estimation procedures (nonparametric). In a parametric model, training data is used to fit the model to the data according to a pre-defined mathematical structure. For example, consider the following polynomial model:

$$y = b_0 + b_1 x_1 + b_2 x_2 + b_3 x_1 x_2 + b_4 x_1^2 + b_5 x_2^2 \qquad (1)$$

In order to completely define this model for a given set of training observations, the polynomial coefficients, are optimized to minimize some objective function, usually the sum of the squared error (SSE). Once the optimal polynomial coefficients have been estimated, the model is completely specified by Equation 1 and the estimated coefficients. Therefore, a parametric model may be roughly defined as a model that may be completely specified by a set of parameters and a functional relationship for applying these parameters to new data in order to estimate the response.

A non-parametric model, by contrast, stores historical data exemplars in memory and processes them when a new query is made. For instance, rather than modeling a whole input space with a parametric model such as a neural network or linear regression, local non-parametric techniques may be used to construct a local model in the immediate region of the query. These models are constructed "on the fly" not beforehand. When the query is made; the algorithm locates historical exemplars in its vicinity and performs a weighted regression with the nearby observations. The observations are weighted with respect to their proximity to the query point. In order to construct a robust local model, one must define a distance function to measure what is considered to be local to the query, implement locally weighted regression, and in some cases consider additional regularization techniques.

As an example, the mathematical framework of a modeling technique such as autoassociative kernel regression (AAKR) is composed of three basic steps. First, the distance between a query vector (the observation comprised of the readings of the multiple sensors in the model) and each of the historical exemplar (memory) vectors is computed using the conventional Euclidean distance or $L^2$-norm:

$$u_j = \sqrt{\sum_{i=1}^{n}(x_{q,i} - m_{j,i})^2} \qquad (2)$$

where, $u_j$ is the distance between the query vector (x) and $j^{th}$ memory vector, n is the number of variables in the data set, $x_{q,i}$ is the $i^{th}$ variable of the query vector, and $m_{j,i}$ is the $i^{th}$ variable of the $j^{th}$ memory vector.

Second, these distances are used to determine weights by evaluating the standard, Gaussian kernel, expressed by:

$$w = K(u, h) = \frac{1}{\sqrt{2\pi \cdot h^2}} e^{-\frac{u^2}{h^2}} \qquad (3)$$

where, h is the kernel's bandwidth. Finally, these weights are combined with the memory vectors to make predictions according to:

$$\hat{x}_q = \frac{\sum_{i=1}^{M} w_i \cdot m_i}{\sum_{i=1}^{M} w_i} \qquad (4)$$

Here, $w_i$ are the weights, $m_i$ are the memory vectors, M is the number of memory vectors, and $\hat{x}_q$ is the prediction for the query vector. Since the monitoring system's objective is to detect and quantify sensor drift, the model should be made as immune as possible to sensor drift. In order to improve the robustness of the AAKR modeling routine, distance functions other than the standard Euclidean distance may be used. Before discussing the alternative distance functions, the parameters used to measure model performance must be discussed.

The performance of autoassociative OLM systems is measured in terms of its accuracy, robustness, and spillover. Accuracy measures the ability of the model to correctly and accurately predict sensor values and is normally presented as the mean squared error (MSE) between the prediction and the correct sensor value. Robustness measures the ability of the model to make correct sensor predictions when the respective sensor value is incorrect due to some sort of fault. Spillover measures the effect a faulty sensor input has on the other sensor predictions in the model. An ideal system would be accurate and would not have sensor predictions affected by degraded inputs.

The most basic form of the AAKR modeling technique makes use of the Euclidean distance or $L^2$-norm described above in Equation 2. Since this distance function squares the individual differences, the effects of a faulty input may be amplified, resulting in parameter predictions which are more affected by input variations and therefore less robust. In order to improve robustness, it is desirable to have distance measures which are not affected by errant sensor readings.

A first robust distance function is the $L^1$-norm, which is defined by the following equation.

$$u_j = \sum_{i=1}^{n} |x_{q,i} - m_{j,i}| \qquad (5)$$

Notice that rather than square the individual differences, the $L^1$-norm uses the absolute value. This alteration provides a modest improvement in robustness, but the distance will still be affected by faulty input. Therefore, an additional step can be taken in the robust distance function to remove faulty input from the distance calculation and improve model robustness. Accordingly, the largest elemental difference contributing to the distance metric is removed, as shown in the following equation:

$$u_j = \sqrt{\sum_{i=1}^{n}(x_{q,i}-m_{j,i})^2 - \max_{i=1}^{n}[(x_{q,i}-m_{j,i})^2]} \quad (6)$$

Here, $$\max_{i=1}^{n}[(x_{q,i}-m_{j,i})^2]$$

is the maximum squared difference of the query vector from the $j^{th}$ memory vector. Simply speaking, one "bad performer" is assumed to exist and its influence is removed from the calculation. To more clearly illustrate Equation 6, consider the following example vectors.

$x_q$=[0.9501 0.2311 0.6068 0.4860]

$m_j$=[0.8913 1.7621 0.4565 0.0185]

The squared differences are found to be:

$$(x_{q,i}-m_{j,i})^2=[0.0035\ 2.3438\ 0.0226\ 0.2185] \quad (7)$$

Notice that the largest squared difference is 2.3438. Therefore, the robust Euclidean distance is defined to be the square root of the sum of the squared distances minus the largest squared difference.

$$u_j=\sqrt{2.5884-2.3438}=0.4946 \quad (8)$$

According to the invention, the robust Euclidean distance is the Euclidean distance with the largest distance or worst performer removed.

This improved robust kernel function can be extended to a variety of similarity operators. Thus, the $L^1$-norm distance function can be improved by subtracting the largest city block distance element from the sum of the city block distances:

$$u_j = \sum_{i=1}^{n}|x_{q,i}-m_{j,i}| - \max_{i=1}^{n}[|x_{q,i}-m_{j,i}|] \quad (9)$$

In fact, any elemental kernel function (one in which the kernel function scalar output is determined by averaging or otherwise combining the scalar comparison results for each element of the compared vectors) is amenable to the improvement of the present invention, by leaving out contribution of the maximally different element from the kernel function calculation.

It may not always be desirable to leave out the maximally different element with each calculation of similarity between two observation vectors. Therefore, in a preferred embodiment of the present invention, a threshold difference is assigned for each element, and the maximum elemental difference is left out of the distance function calculation only if that elemental difference is greater than the threshold specified for that element. The threshold can be determined in a number of ways, either for each element (sensor) individually, or across all the variables (sensors) uniformly. By way of example, a percentage of the range seen in the data for the sensor can be used as a threshold for maximal elemental difference. Another particularly effective method according to the invention comprises the steps of (a) first scaling data for each sensor to a zero-mean centered range where +/−1 is set to one standard deviation; (b) setting the threshold for excluding maximal elemental difference equal to a multiplier of the standard deviation, e.g., 0.5 times the standard deviation. Furthermore, more than one elemental difference can be excluded from the calculation of the distance metric if they exceed their thresholds. A maximum limit on the number of elements that can be excluded can be set, such that, for example, in a 9-variable model, if 4 elemental differences are larger than their exclusionary threshold, but the maximum cap on excluded elements is 3, then the 3 elements with the largest elemental differences are excluded, and the fourth is included in the distance metric, even though it exceeds its threshold.

The weights described in Equation 3 can also be derived in several alternative ways. Regardless of the exact manner in which the distance metric is used to determine weights, the important aspect is that the weights are greatest (the absolute value of the kernel function is maximum) when the two vectors being compared are identical, and the weights diminish as the two vectors being compared are increasingly different. For example, the weights can be determined according to:

$$w = K(u, R) = \frac{1}{1+\frac{u^\lambda}{R}} \quad (10)$$

where R and the power $\lambda$ are tuning factors. Another way to determine the weights according to the present invention is:

$$w = K(u, R) = 1 - \frac{u^\lambda}{R} \quad (11)$$

where again R and the power $\lambda$ are tuning factors.

Furthermore, the mathematical framework of Equation 4 (AAKR) is just one framework in which the memory vectors can be combined according to the weights w. In the framework of similarity-based modeling, the memory vectors are also compared to each other using the kernel function to produce a M-square matrix G of scalar values for the comparison of the M memory vectors:

$$G=K(M,h) \quad (12)$$

where M is the matrix formed by all memory vectors as columns, and h is a vector of n bandwidths h for each sensor. The weights can similarly be written in matrix notation as:

$$w=K(U,h) \quad (13)$$

where w is the weight vector of n weights $w_i$, U is a the vector of distance function results of input observation x and the memory vectors of M, and h is the bandwidths vector. Then, the estimate vector $\hat{x}$ can be determined with similarity-based modeling as:

$$\hat{x}q = M \cdot G^{-1} \cdot w \quad (14)$$

EXAMPLE

Figure 1:
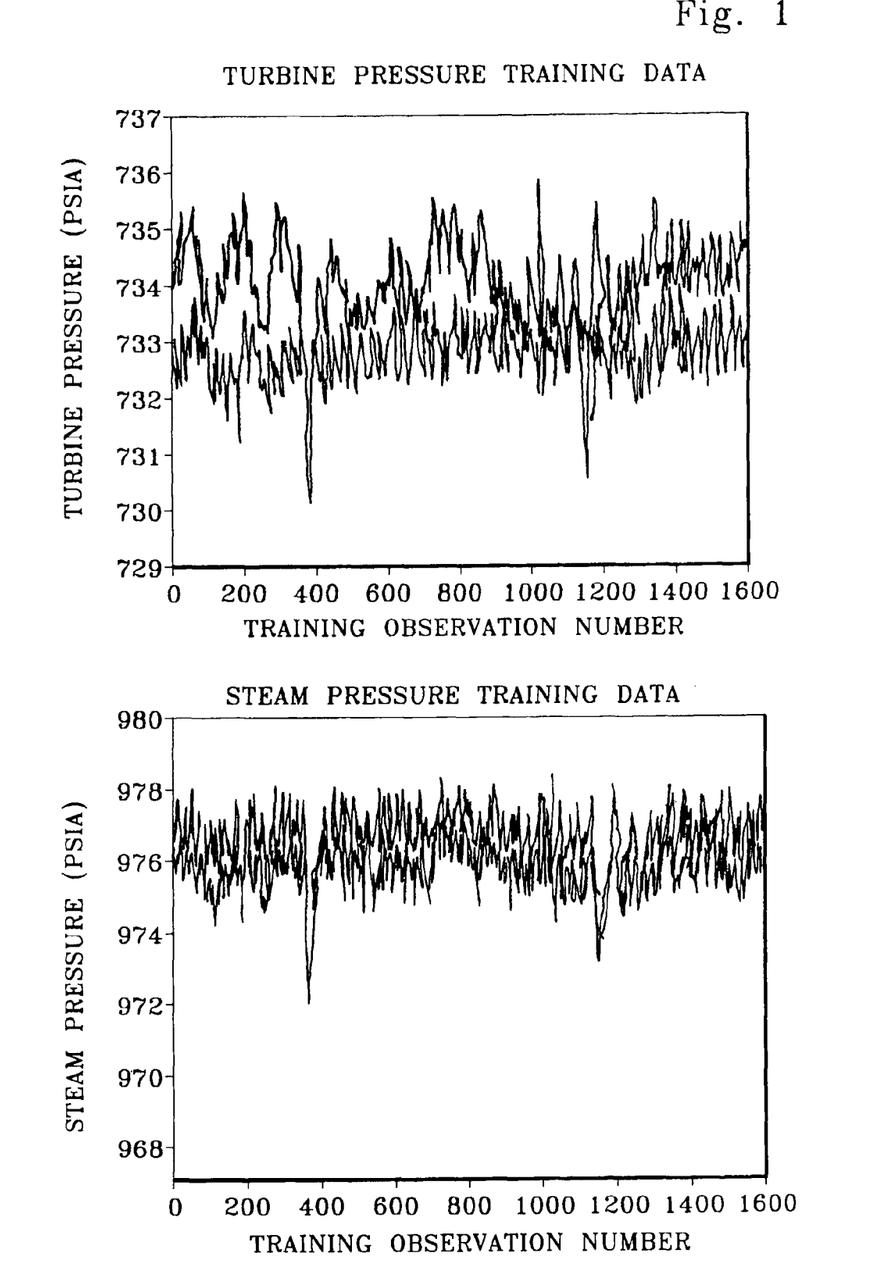
FIG. 1 comprises charts (a) data from turbine pressure sensors and (b) data from steam pressure sensors in a nuclear power plant, used to train nonparametric estimation models as may be used with embodiments of the present invention.

Data was collected from an operating nuclear power plant steam system and used to compare and evaluate the robust distance metrics. The model is used to monitor steam system sensor calibration at an operating plant and contains 5 plant sensors, primarily from one loop, which include 2 turbine pressure sensors and 3 steam pressure sensors. The quoted sensor units are as follows: 1) turbine pressure in pounds per square inch atmospheric (PSIA) and 2) steam pressure in pounds per square inch gauge (PSIG). The training data for each of the sensor types is shown in FIG. 1. The data presented in FIG. 1 was selected from data collected every two minutes over a two-month period. Overall, the training and test data spans approximately 2 weeks of data observing every $5^{th}$ sample or every 10 seconds.

The training data was chosen to be 1,600 observations from steady state plant operation. The test data were chosen to be a successive set of 400 observations sampled from steady state plant operation. The training data were used to develop the empirical models and the test data were used to evaluate the performance of the empirical models.

For completeness, the AAKR model was developed with 800 memory vectors and a bandwidth of 0.5, using the form of Equation 3. The resulting accuracy, robustness, and spillover performance metrics are listed in Table 1.

TABLE 1

Accuracy, robustness, and spillover performance for compared distance functions.

|  |  | Turbine Pressure | | Steam Pressure | | | |
| --- | --- | --- | --- | --- | --- | --- | --- |
|  |  | #1 | #2 | #3 | #4 | #5 | Average |
| Accuracy | Euclidean | 0.23 | 0.60 | 0.44 | 0.21 | 0.29 | 0.35 |
|  | $L^1$-norm | 0.08 | 0.20 | 0.28 | 0.07 | 0.02 | 0.17 |
|  | Robust Euclidean | 0.59 | 2.80 | 0.89 | 0.42 | 0.36 | 1.10 |
| Robust-ness | Euclidean | 0.56 | 0.63 | 0.29 | 0.33 | 0.37 | 0.44 |
|  | $L^1$-norm | 0.64 | 0.73 | 0.21 | 0.25 | 0.24 | 0.41 |
|  | Robust Euclidean | 0.20 | 0.23 | 0.23 | 0.18 | 0.13 | 0.19 |
| Spillover | Euclidean | 0.11 | 0.11 | 0.18 | 0.18 | 0.16 | 0.15 |
|  | $L^1$-norm | 0.11 | 0.12 | 0.12 | 0.15 | 0.12 | 0.13 |
|  | Robust Euclidean | 0.09 | 0.12 | 0.06 | 0.08 | 0.09 | 0.09 |

Figure 2:
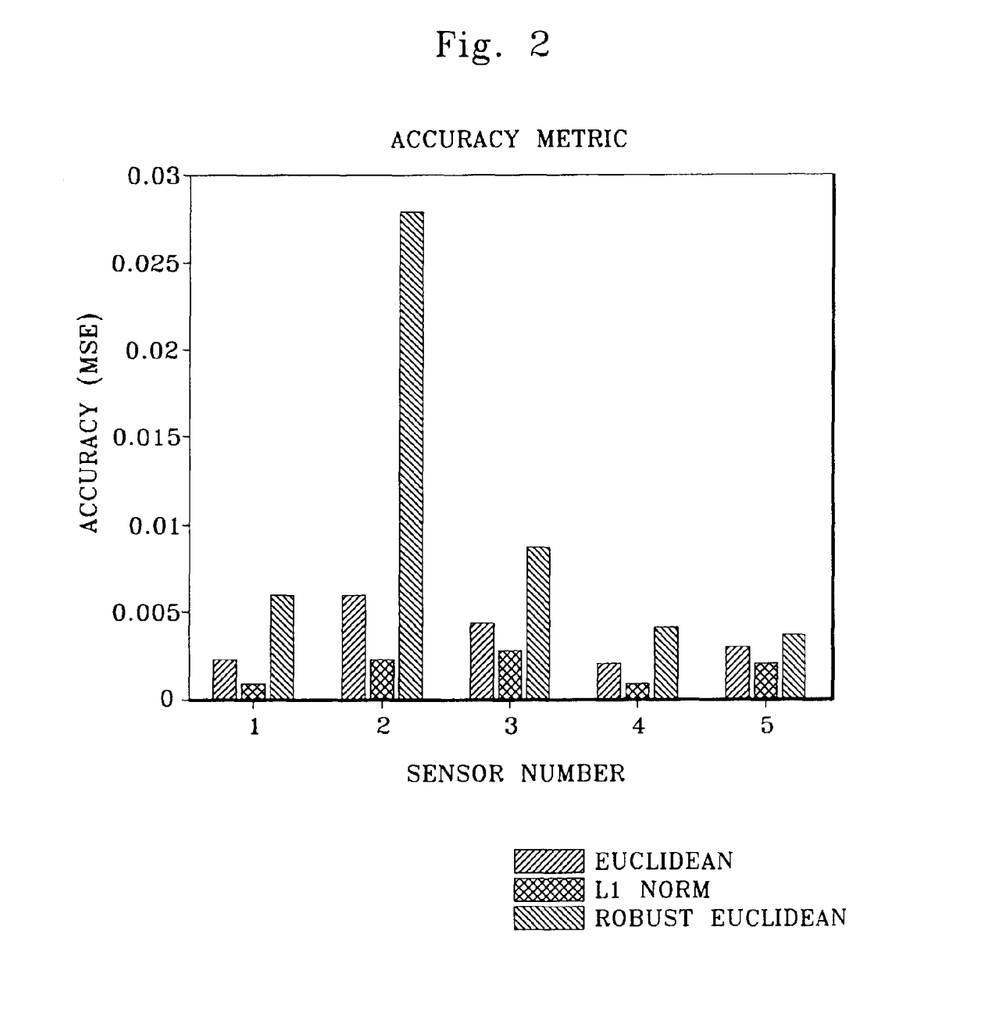
FIG. 2 is a bar graph showing the computed accuracy for five sensors in a nonparametric estimation model, for three alternatives of the model employing (a) an ordinary Euclidean distance metric, (b) an $L^1$-norm distance metric, and (c) a robust Euclidean distance metric according to an embodiment of the invention.
Figure 3:
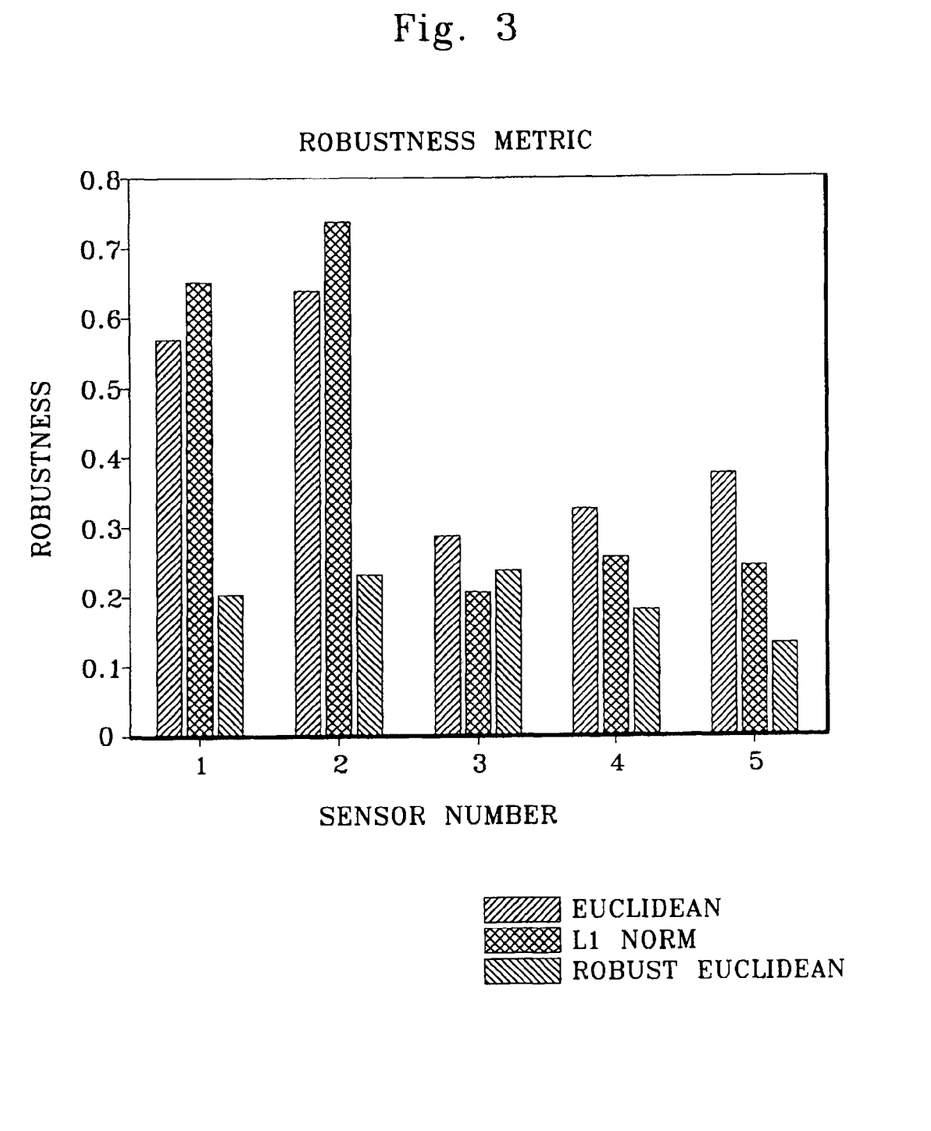
FIG. 3 is a bar graph showing the computed robustness for five sensors in a nonparametric estimation model, for three alternatives of the model employing (a) an ordinary Euclidean distance metric, (b) an $L^1$-norm distance metric, and (c) a robust Euclidean distance metric according to an embodiment of the invention.
Figure 4:
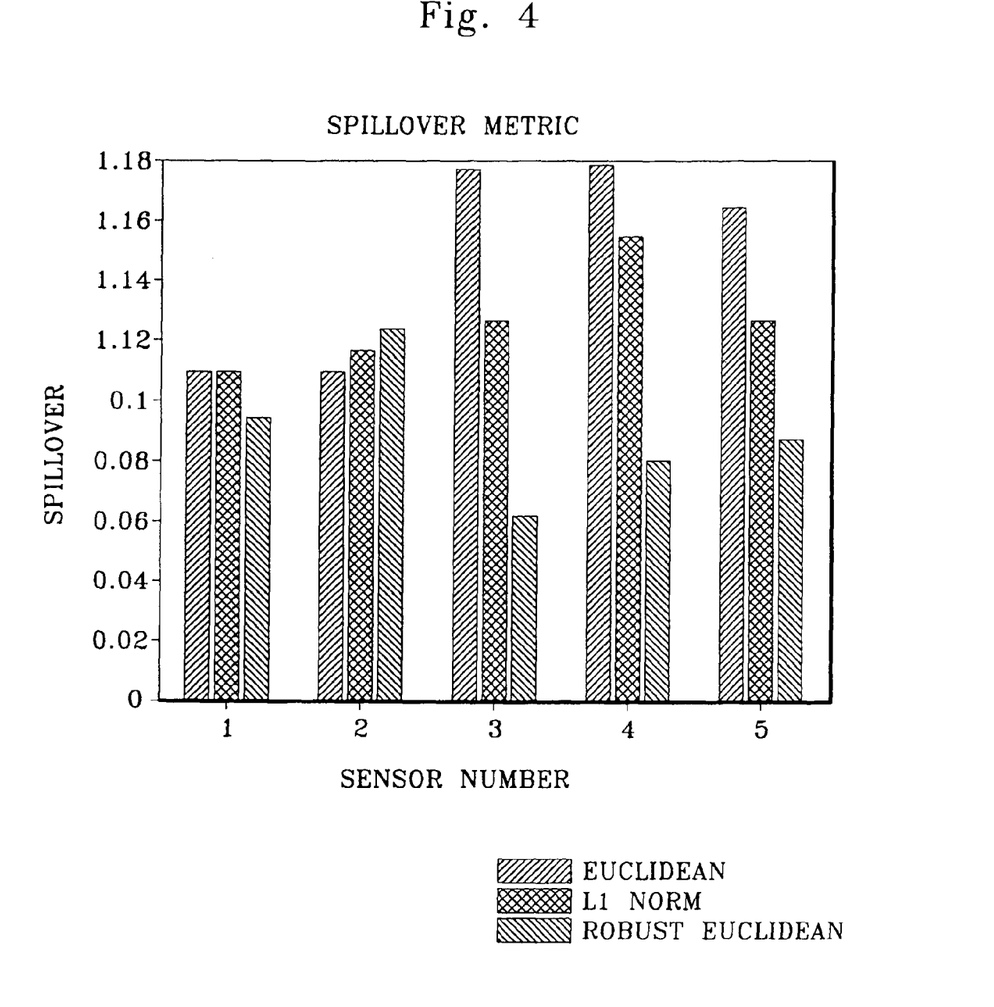
FIG. 4 is a bar graph showing the computed spillover for five sensors in a nonparametric estimation model, for three alternatives of the model employing (a) an ordinary Euclidean distance metric, (b) an $L^1$-norm distance metric, and (c) a robust Euclidean distance metric according to an embodiment of the invention.

Turning to FIG. 2, the accuracy of the respective distance metrics are compared. FIG. 3 shows the respective robustness performance metrics. FIG. 4 shows the respective spillover. Generally, a lower value indicates better performance for the metric. These figures show a decrease in robustness and spillover for the robust distance functions. In other words, the models that use the robust distance functions are less affected by faulty input and are considered to be more robust. This increased robustness is not without consequence though, as all of the variable accuracy metrics (MSE) for the robust Euclidean distance function are larger than those of the model with the $L^2$-norm. Even though there may be an increase in the accuracy metric (predictive error of the model), using the normal $L^2$-norm, the decreases in robustness and spillover metrics using the $L^1$-norm and robust Euclidean distance more than validate its effectiveness in detecting sensor drift. Ultimately, what is important in equipment fault detection and sensor drift detection is robustness, and accuracy does not need to be exacting. This is because accuracy can represent merely overfitting, in which case the fault may not be identified in a timely fashion. Robustness on the other hand is critical to fault detection as the input becomes increasingly incorrect. A less accurate model may still outperform a more accurate model on fault detection because the error between the estimates and actual values serves as a baseline against which the more robust, less accurate model evidences drifts and deviations better.

Figure 5:
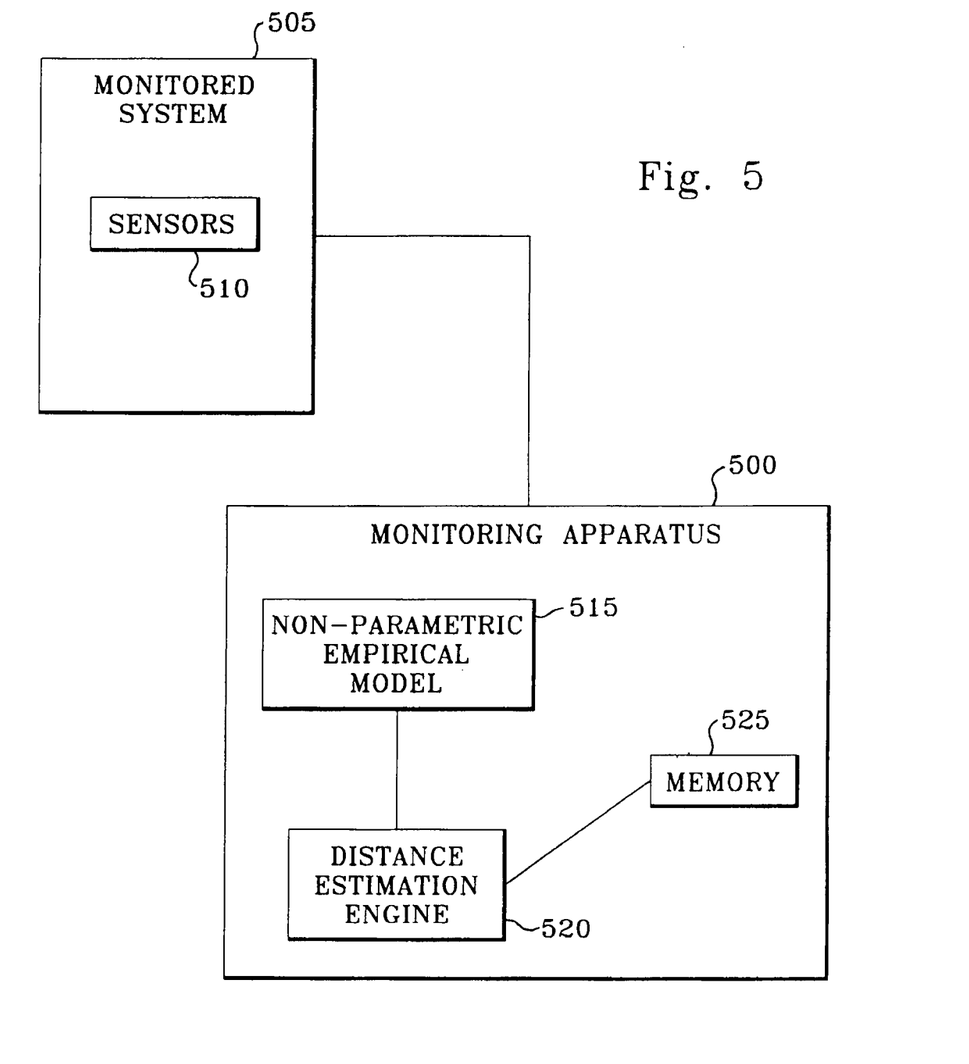
FIG. 5 illustrates a monitoring apparatus 500 for monitoring a monitored system 505 and according to an embodiment of the invention.

FIG. 5 illustrates a monitoring apparatus 500 for monitoring a monitored system 505 and according to an embodiment of the invention. The monitored system 505 may comprise, for example, a fossil fueled power plant environment. A set of sensors 510 monitor various parts, sections, or areas within the monitored system 505. For example, the sensors may monitor temperatures or flow rates at various locations in the monitored system 505.

The sensors 510 provide a query vector, based on the measurements of the set of sensors 510, to the monitoring apparatus 500. The monitoring apparatus 500 includes several devices or modules, such as a non-parametric empirical model 515, a distance estimation engine 520, and a memory 525. The non-parametric empirical model 515 generates estimates of parameter values in response to receiving the query vector of monitored parameter. The distance estimation engine 515 determines robust distances between the query vector and each of a set of predetermined historical vectors for the non-parametric empirical model based on an implementation of an elemental kernel function. The distance estimation engine 515 also determines weights for the monitored parameters based on the robust distances and combines the weights with the predetermined historical vectors to make predictions for the system.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

I claim:

1. A method for making predictions based on a non-parametric empirical model used in monitoring a system, the method comprising:
   providing a processor;
   receiving at the processor a query vector of multiple query sensor values for different monitored parameters for the non-parametric empirical model characterizing the system;
   determining, with the processor, robust distances between the query vector and each of a set of predetermined historical vectors, each historical vector having multiple historical sensor values, for the non-parametric empirical model based on an implementation of an elemental kernel function including:
       performing an elemental calculation between each query sensor value of the query vector and a corresponding historical sensor value of each historical vector, wherein each elemental calculation results in a single elemental contributor for each pair of corresponding query and historical sensor values,
       eliminating at least one, but less than all, of the elemental contributors formed from at least one comparison between the query vector and the historical vector, and depending on the values of the elemental contributors,
       calculating the robust distance between the query vector and the historical vector using a calculation with the remaining elemental contributors;
   determining weights for the monitored parameters based on the robust distances calculated using the query vector;
   combining the weights with the predetermined historical vectors to make predictions for the system.

2. The method of claim 1, wherein the non-parametric empirical model is based on an autoassociative kernel regression model.

3. The method of claim 1, wherein the non-parametric empirical model is based on a similarity based model.

4. The method of claim 1, wherein the elemental kernel function is Euclidean distance.

5. The method of claim 1, wherein the elemental kernel function is a city block distance.

6. The method of claim 1, wherein the determining robust distances comprises removing a largest elemental contributor to the elemental kernel function.

7. The method of claim 1, wherein the determining robust distances comprises removing at least one of a set of largest elemental contributors to the elemental kernel function based on a threshold distance assigned for each element.

8. The method of claim 1 wherein at least one elemental contributor is eliminated from the robust distance calculation for each query-historical vector comparison.

9. An apparatus for monitoring an operation of a system characterized by operational parameters, comprising:

a non-parametric empirical model for generating estimates of parameter values in response to receiving a query vector of multiple query sensor values for different monitored parameters for a model characterizing the system;

a distance estimation engine for determining robust distances between the query vector and each of a set of predetermined historical vectors of multiple historical sensor values for the non-parametric empirical model based on an implementation of an elemental kernel function including:

performing an elemental calculation between each query sensor value of the query vector and a corresponding historical sensor value of the historical vector wherein each elemental calculation results in a single elemental contributor for each pair of corresponding query and historical sensor values, eliminating at least one, but less than all, of the elemental contributors formed from at least one comparison between the query vector and the historical vector, and calculating the robust distance between the query vector and the historical vector using a calculation with the remaining elemental contributors;

determining weights for the monitored parameters based on the robust distances calculated using the query vector; and combining the weights with the predetermined historical vectors to make predictions for the system.

10. The apparatus of claim 9, wherein the non-parametric empirical model is based on an auto-associative kernel regression model.

11. The apparatus of claim 9, wherein the non-parametric empirical model is based on a similarity based model.

12. The apparatus of claim 9, wherein the elemental kernel function is Euclidean distance.

13. The apparatus of claim 9, wherein the elemental kernel function is a city block distance.

14. The method of claim 9, wherein the distance estimation engine determines the robust distances at least partially by removing a largest elemental contributor to the elemental kernel function.

15. The apparatus of claim 9, wherein the distance estimation engine determines the robust distances at least partially by removing at least one of a set of largest elemental contributors to the elemental kernel function based on a threshold distance assigned for each element.

16. The apparatus of claim 9 wherein at least one elemental contributor is eliminated from the robust distance calculation for each query-historical vector comparison.

* * * * *

UNITED STATES PATENT AND TRADEMARK OFFICE
CERTIFICATE OF CORRECTION

| | | |
|---|---|---|
| PATENT NO. | : 8,311,774 B2 | Page 1 of 1 |
| APPLICATION NO. | : 11/956809 | |
| DATED | : November 13, 2012 | |
| INVENTOR(S) | : Hines | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this
Ninth Day of September, 2014

Michelle K. Lee
*Deputy Director of the United States Patent and Trademark Office*